US009581110B1

(12) United States Patent
Herrera et al.

(10) Patent No.: US 9,581,110 B1
(45) Date of Patent: Feb. 28, 2017

(54) MAVERICK IGNITER CABLE SAVER

(71) Applicant: THE UNITED STATES OF AMERICA AS REPRESENTED BY THE SECRETARY OF THE NAVY, Washington, DC (US)

(72) Inventors: Brandi A. Herrera, Ridgecrest, CA (US); Gregory J. Magas, Ridgecrest, CA (US); Daniel T. Connor, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 445 days.

(21) Appl. No.: 14/257,689

(22) Filed: Apr. 21, 2014

(51) Int. Cl.
*F16B 2/22* (2006.01)
*F02K 9/95* (2006.01)
*F42D 1/04* (2006.01)

(52) U.S. Cl.
CPC .................. *F02K 9/95* (2013.01); *F16B 2/22* (2013.01); *F42D 1/043* (2013.01)

(58) Field of Classification Search
CPC .... F16B 2/243; F16B 2/22; F16L 3/13; Y10T 24/4406; Y10T 24/44769; F02K 9/32; F02K 9/34; F02K 9/343; F02K 9/95; F42D 1/043
USPC ........ 248/74.2, 71, 73, 62, 65, 74.1, 229.16, 248/229.26, 231.81, 231.9; 24/458, 625; 89/1.813, 1.814; 102/275.2, 275.7, 102/275.11, 275.12
See application file for complete search history.

(56) References Cited

U.S. PATENT DOCUMENTS

| | | | | | |
|---|---|---|---|---|---|
| 2,065,843 | A | * | 12/1936 | Van Uum | F16L 3/127 248/71 |
| 2,366,456 | A | * | 1/1945 | Pheazey | F16L 3/04 248/73 |
| 2,563,240 | A | * | 8/1951 | Heath | F16B 2/241 24/458 |
| 2,634,472 | A | * | 4/1953 | Brown | F16L 3/04 248/73 |
| 2,981,513 | A | * | 4/1961 | Brown | F16L 3/127 248/220.43 |
| 3,345,706 | A | * | 10/1967 | Stokes | F16B 5/0685 24/458 |
| 4,356,987 | A | * | 11/1982 | Schmid | F16G 11/02 24/458 |
| 4,379,536 | A | * | 4/1983 | Mizuno | F16B 5/0685 24/459 |
| 5,967,468 | A | * | 10/1999 | Veghte | F16B 2/22 248/71 |
| D570,203 | S | * | 6/2008 | Shiomoto | 24/297 |

(Continued)

OTHER PUBLICATIONS

Plastics International; Annealing of ABS; https://www.plasticsintl.com/documents/ABS%20Annealing.pdf Feb. 1, 2001.*

*Primary Examiner* — Ingrid M Weinhold
(74) *Attorney, Agent, or Firm* — James M. Saunders

(57) ABSTRACT

A maverick igniter cable saver employs a longitudinal housing having a first portion, a second portion, an outer surface, an inner surface, a forward end, and an aft end. The inner surface of the first portion is configured to snap fasten substantially around an igniter cable. The second portion has off-setting tapered tabs. Each of the tapered tabs has a proximal end and a distal end. The distal ends are interfaces configured to friction-fit in an umbilical slot groove.

10 Claims, 3 Drawing Sheets

(56) References Cited

U.S. PATENT DOCUMENTS

| | | | | |
|---|---|---|---|---|
| D572,129 | S | * | 7/2008 | Keays .............................. 24/297 |
| D636,661 | S | * | 4/2011 | Marmas ......................... D8/395 |
| 8,439,316 | B2 | * | 5/2013 | Feige ........................ F16L 3/13 248/71 |
| 2011/0226913 | A1 | * | 9/2011 | Feige ........................ F16L 3/13 248/74.2 |

\* cited by examiner

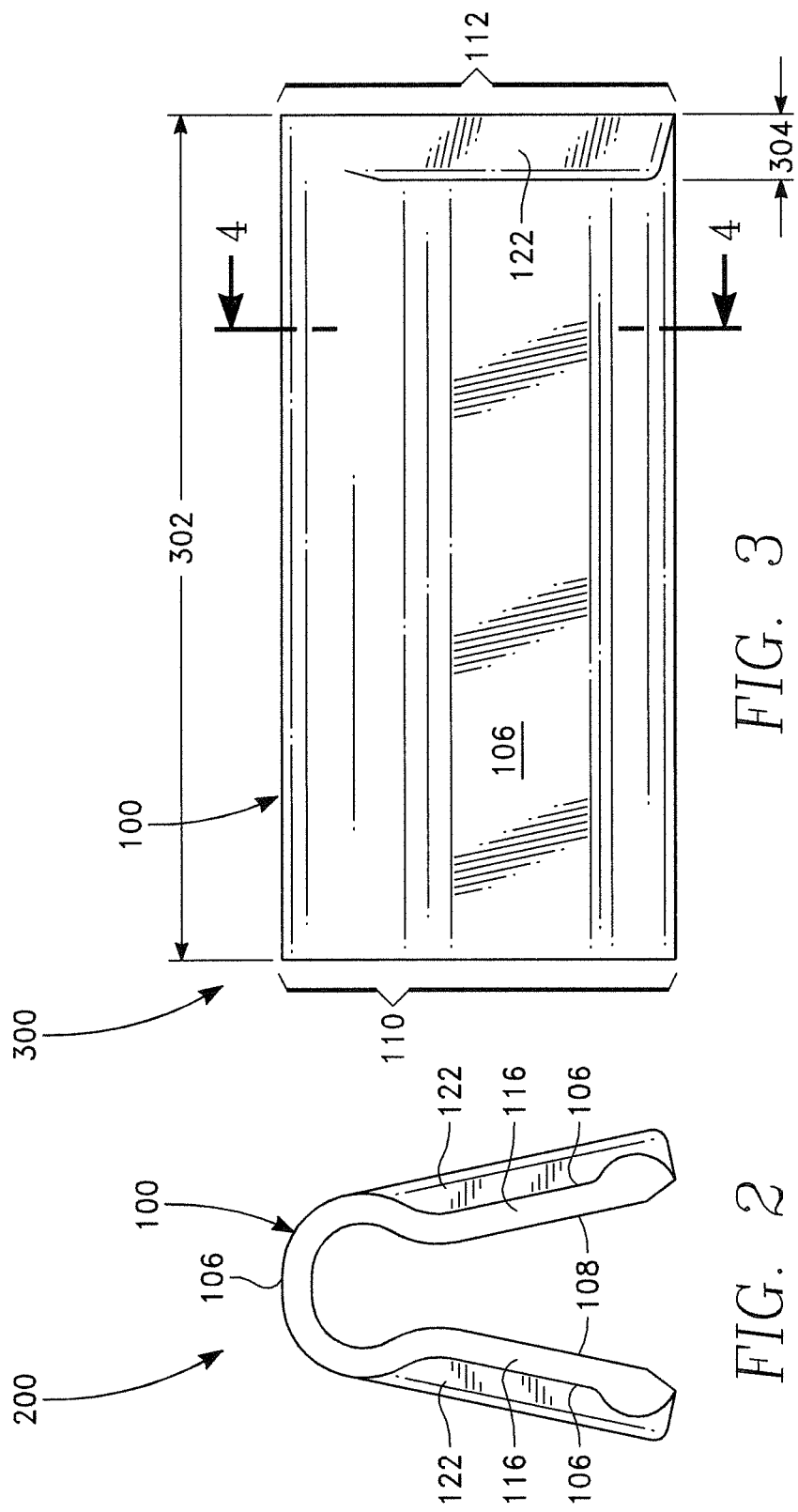

MAVERICK IGNITER CABLE SAVER

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to igniter cables and, more particularly, to aiding in the installation of igniter cables and preventing igniter cable degradation.

BRIEF DESCRIPTION OF THE DRAWINGS

FIG. 2 is a forward view of an apparatus, according to some embodiments of the invention.

FIG. 3 is a side view of the apparatus of FIG. 1, showing cut plane 4-4 (section 4-4 is depicted in FIG. 4), according to some embodiments of the invention.

Figure 1:
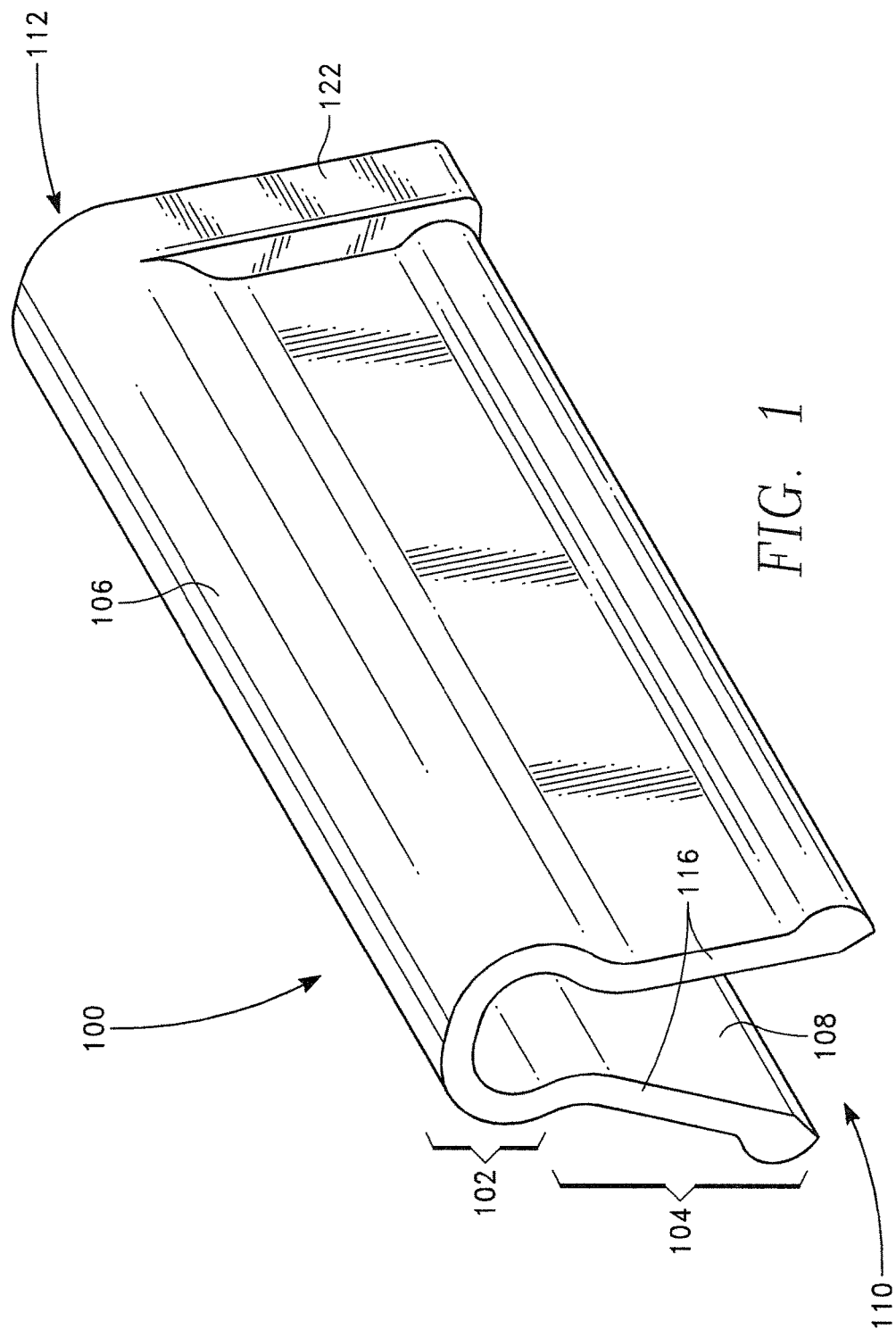
FIG. 1 is an oblique perspective view of an apparatus, according to some embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to igniter cables and, more particularly, to aiding in the installation of igniter cables and preventing igniter cable degradation, especially cable chafing. In particular, upon loading to an aircraft, the igniter cable is held in a slot in the umbilical housing assembly (UEMA). The umbilical housing assembly, sometimes called an umbilical slot groove, is metal which can chafe the cable. Pushing the cable into the slot is very difficult. Ground crews usually use a blunt object such as, for example, the back ends of a screw driver or paint brush to force the cable into the slot. This results in chafing of the cable. Additionally, removing the cable out of the slot after flight requires a hard pull which has also resulted in cable chafing. A chafed cable eventually has to be replaced and the replacement procedure and costs are not trivial. The average cost to repair a rocket motor igniter cable is approximately $2000 plus shipping and other transit costs. Embodiments of the invention solve this problem by being an interface between the cable and the slot, while also securely holding the cable in position. The cost of the apparatus is a fraction in comparison, even if the apparatus is a one-use device that is disposed of after each use. For purposes here, the apparatus may be used more than once or only once, depending on the conditions experienced during use.

Although embodiments of the invention are described in considerable detail, including references to certain versions thereof, other versions are possible such as, for example, orienting and/or attaching components in different fashion. Therefore, the spirit and scope of the appended claims should not be limited to the description of versions included herein.

In the accompanying drawings, like reference numbers indicate like elements. Reference character 100 refers to an apparatus, according to some to embodiments of the invention. The apparatus 100 is an igniter cable saver clip and is sometimes simply referred to as a clip, sleeve, or longitudinal housing. Other variations, of course, are possible without detracting from the merits or generalities of embodiments of the invention.

Figure 4:
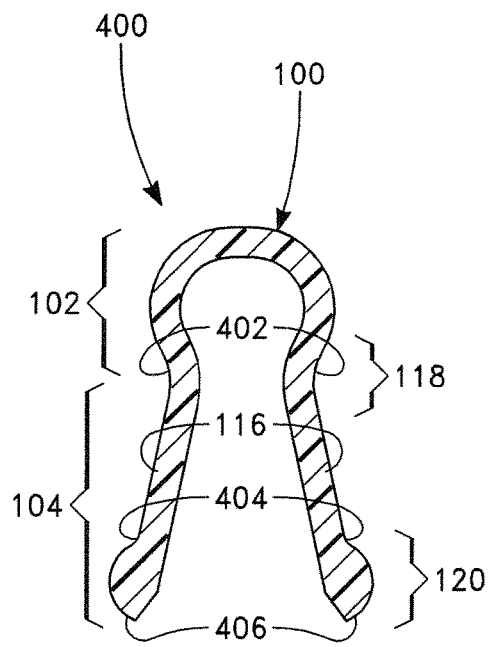
FIG. 4 is a section view perpendicular to cut plane 4-4 of FIG. 3, according to some embodiments of the invention.
Figure 5:
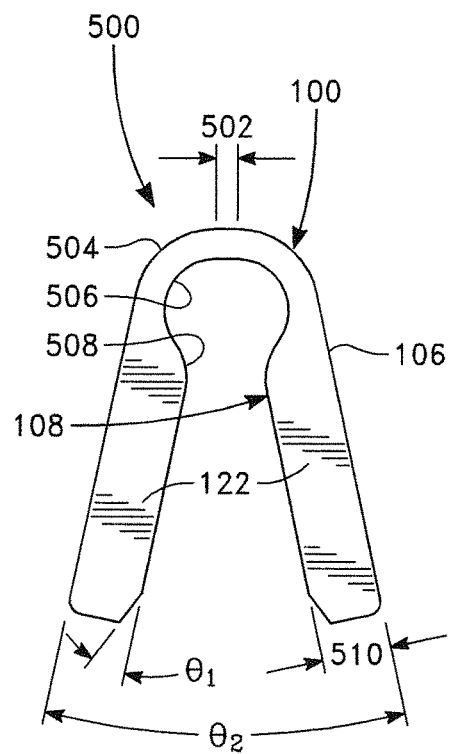
FIG. 5 is an aft view of an apparatus, according to some embodiments of the invention.
Figure 6:
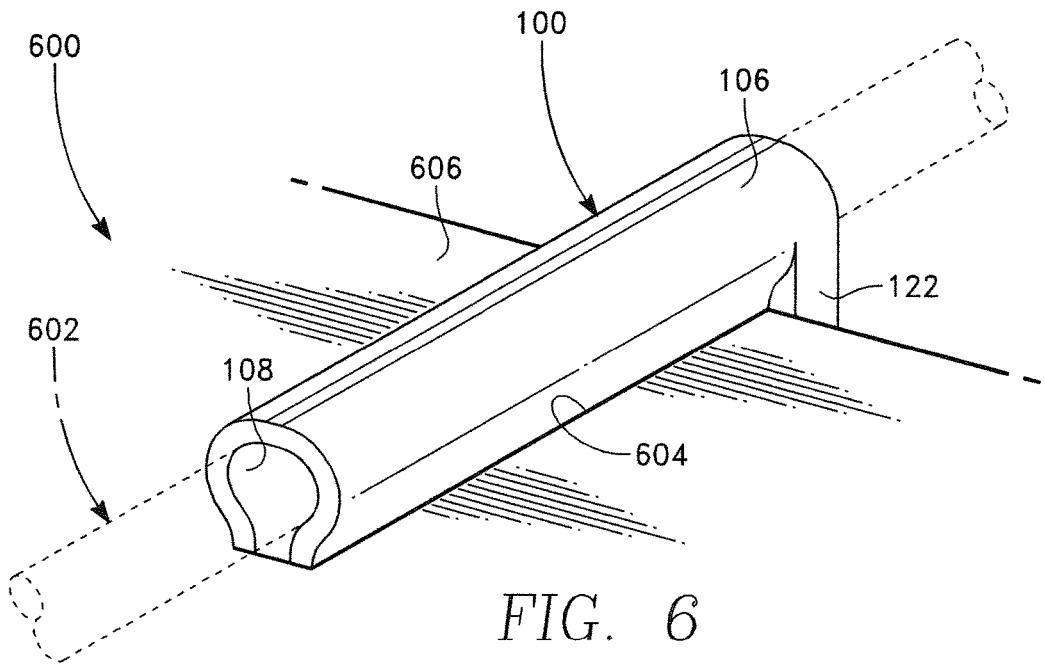
FIG. 6 is an inverted oblique perspective view of the environment and how the apparatus in FIG. 1 relates to the environment, according to some embodiments of the invention.

FIG. 1 is an oblique perspective view of the clip and is depicted as reference character 100. FIG. 2 is a forward view, depicted as reference character 200, of the clip 100 in FIG. 1. FIG. 3 is a side view, depicted as reference character 300, of the clip 100 and showing cut plane 4-4 (section 4-4 is depicted in FIG. 4). FIG. 4 is a section view, depicted as reference character 400, perpendicular to cut plane 4-4 of FIG. 3. FIG. 5 is an aft view (depicted as reference character 500) of the clip 100, according to some embodiments of the invention. FIG. 6 is an inverted oblique perspective view of the environment (depicted as reference character 600) and how the clip (100) in FIG. 1 relates to the environment, according to some embodiments of the invention.

Referring simultaneously to FIGS. 1 through 6, embodiments of the invention generally relate to a clip having a longitudinal housing 100. The longitudinal housing 100 has a first portion 102, a second portion 104, an outer surface 106, and an inner surface 108. Reference character 108 refers to the inner surface of the entire longitudinal housing 108. Both the outer surface 106 and inner surface 108 are solid. The longitudinal housing 100 is non-perforated. The longitudinal housing 100 has a forward end 110 and an aft end 112. The inner surface 108 associated with the first portion 102 is configured to snap fasten substantially around an igniter cable. The igniter cable is depicted as reference character 602 in FIG. 6. The igniter cable 602 is a Maverick rocket motor igniter cable, although the embodiments of the invention as disclosed herein are applicable to many other types of cables and associated mechanisms and, therefore, the particular type of cable and associated mechanisms should not be construed as limiting. Additionally, a person having ordinary skill in the art will recognize that the terms "grip," "hold," "clamp," and "secure" are equally applicable to relation of the igniter cable 602 to the first portion 102.

The second portion 104 has outwardly flaring tabs 116. Two outwardly flaring tabs 116 are shown but any number could be used depending on the arrangement and geometry of slot that the apparatus 100 is used in conjunction with. The outwardly flaring tabs 116 have proximal 118 and distal 120 ends (FIG. 4). The distal ends 120 are interfaces configured to friction-fit with an umbilical slot groove 604 (FIG. 6). The umbilical slot groove 604 is an umbilical engagement mechanism assembly on a LAU-117 launcher. A person having ordinary skill in the art will recognize that embodiments of the invention are applicable to other launcher systems and that the term "engage" or the like may also be used to describe the relationship between the interfaces and the umbilical slot groove 604.

The apparatus/longitudinal housing 100 is an injection mold. In some embodiments, the longitudinal housing is plastic, while in other embodiments, the longitudinal housing is more specifically acrylonitrile butadiene styrene (ABS) HI121H black silicone. After the molding process is complete, the apparatus 100 allowed to cool for about 24 hours. The apparatus/longitudinal housing 100 is placed in an oven and heat treated at about 200 degrees F. for about 14 hours and then allowed to cool to room temperature. ABS is used because the apparatus 100 has to survive both hot and cold temperatures and not cause foreign object damage (FOD) to aircraft.

The outwardly flaring tabs 116 are flexible enough to allow the second portion 104, and particularly closer to the distal ends 120 to be squeezed together from a first position to a second position upon application of an external force against the outer surface 106 of the second portion 104 on the outwardly flaring tabs. The outwardly flaring tabs 116, in some embodiments, may be actuated by hand from a first (rest) position to a second (closed) position, allowing insertion into the umbilical slot groove 604.

In some embodiments, the outwardly flaring tabs 116 have a molded rectangular portion 122 at the aft end 112. The rectangular portion 122 is a lost motion connection and clip removal mechanism. Thus, the rectangular portion 122 stops motion, keeping the apparatus 100 from sliding out of the aft end 112 and also eases with removing the apparatus. Removal is done by applying a force from the forward end 110 towards the aft end 112 and against the rectangular portion 122.

Referring to FIG. 3, the apparatus 100 is dimensioned for fit and function with the umbilical slot groove (604 in FIG. 6). Reference character 302 depicts the length of the apparatus 100. In some embodiments, the length 302 is about 1.30 inches. The rectangular portion 122 has a bottom side profile width of about 0.10 inches, as depicted by reference character 304.

Referring to FIG. 4, the outwardly flaring tabs 116 proximal ends 118 have diametrically-opposed radii 402 of about 0.10 inches. The interfaces 120 (the distal ends) have first 404 and second 406 radii portions that engage the respective portions of the umbilical slot groove 604. Thus, the interfaces 120 are so dimensioned as to be insertable into and engageable with the umbilical slot groove 604. As shown in FIG. 4, the first radii portion 404 has two diametrically-opposed radii of about 0.02 inches. The second radii portion 406 has two diametrically-opposed (approximately 180 degrees apart) radii of about 0.064 inches.

In the aft view of FIG. 5, the outer surface 106 has a substantially flat portion 502 that is about 0.033 inches. From the substantially-flat portion 502, the outer surface 106 transitions to a radius of about 0.125 inches, as depicted by reference character 504. The inner surface 108 has a radius of about 0.080 inches (shown with reference character 506), transitions to a radius of about 0.10 inches (reference character 508), and then transitions to the molded rectangular portion 122. Reference character 510 depicts the distal end of the molded rectangular portion 122 and is about 0.105 inches. The depicted angles, $\theta_1$ and $\theta_2$, are approximately 25 and 24 degrees, respectively.

As constructed, the interfaces 120 are friction-fit in the umbilical slot groove 604. If an installer determines that the apparatus 100 should be slightly positioned laterally in one direction or the other in the umbilical slot groove 604, the user can apply an appropriate force in the direction of movement by tapping or pushing, as an example, on the rectangular portion 122. A person having ordinary skill in the art will recognize that the dimensions may be varied to accommodate different umbilical slot groove sizes without detracting from the merits or generality of embodiments of the invention.

Another embodiment of the invention generally relates to a method of assembling any igniter cable saver clip and igniter cable to an umbilical slot engagement assembly on an LAU-117 launcher. The method includes providing a longitudinal housing 100 having a first portion 102, a second portion 104, an outer surface 106, an inner surface 108, a forward end 110, and an aft end 112. The second portion 104 has outwardly flared tabs 116 as described above.

The user aligns the inner surface 108 of the first portion 102 parallel to the igniter cable 602. The user then snap-fastens the igniter cable 602 to the inner surface 108 of the first portion 102 by pushing the igniter cable perpendicularly toward the inner surface of the first portion until the inner surface of the first portion is snap-fastened substantially around the igniter cable. The user will hear an audible click sound when the igniter cable 602 is in place (substantially inside the inner surface 108 of the first portion 102).

The user applies an external force against the outer surface 106 of the second portion 104 on outwardly flared tabs 116 to squeeze the outwardly flared tabs together from a first position to a second position. The user then inserts the distal ends 120 of the outwardly flared tabs 116 into the umbilical slot engagement groove 604 by applying an external force against the outer surface 106 of the first portion 102 and perpendicular to the LAU-117 launcher 606 and umbilical slot groove 604.

Testing of the Apparatus

Significant material and vibrational testing has been completed to show airworthiness and functionality of the apparatus 100. The material tests involved pulling the apparatus 100 out of the umbilical slot groove 604 at hot, cold, and room temperatures, and comparing the results against the cable 602 (tests of how the cable by itself fared). Vibrational testing of the apparatus 100 was also performed in accordance with MIL-STD-810G. Early testing showed promise at cold and room temperatures, but at high temperatures, the apparatus 100 would begin to experience stress relaxation and stay closed. This negated the friction force that held the apparatus 100 in place and the clip would slide out. Heat treatment was added to the process and dramatically reduced the stress relaxation effects. Additionally, the apparatus 100 was extended in length slightly to allow for more surface area contact with the umbilical slot groove 604 and tabs 116 flared as described above.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An interface clip between a rocket motor igniter cable and an umbilical slot groove, the interface clip comprising:
   a longitudinal housing having a substantially U-shaped first portion, a second portion, an outer surface, an inner surface, a forward end, and an aft end;
   wherein said first portion is configured to snap fasten substantially around the rocket motor igniter cable;
   wherein said second portion having two outwardly flaring tabs extending from said first portion, wherein each of said two outwardly flaring tabs having a proximal end and a distal end, wherein said distal ends are interfaces configured to friction-fit in the umbilical slot groove;

wherein each of said two outwardly flaring tabs having corresponding substantially rectangular portions integrally molded at said aft end and extending substantially perpendicular to the outwardly flaring tabs, each of said corresponding substantially rectangular portions spanning from said first portion to respective said distal ends of said second portion;

wherein said distal ends of said second portion each have outwardly protruding radiuses spanning from the forward end to respective said corresponding substantially rectangular portions;

wherein said two outwardly flaring tabs are configured to squeeze together from a first position to a second position upon an external force against said outer surface of said second portion on said outwardly flaring tabs to allow the interface clip to be inserted into the umbilical slot groove.

2. The interface clip according to claim 1, wherein said longitudinal housing is an injection mold.

3. The interface clip according to claim 1, wherein said longitudinal housing is plastic.

4. The interface clip according to claim 1, wherein said longitudinal housing is acrylonitrile butadiene styrene (ABS).

5. The interface clip according to claim 1, wherein said longitudinal housing is injection molded and is cooled for about 24 hours after molding, wherein said longitudinal housing is then heat treated at about 200 degrees F for about 14 hours and then cooled to room temperature.

6. The interface clip according to claim 1, wherein said two outwardly flaring tabs are configured to actuate by hand.

7. The interface clip according to claim 1, where each of said two outwardly flaring tabs' proximal ends have diametrically-opposed radii of about 0.10 inches.

8. The interface clip according to claim 1, wherein said outer surface of said longitudinal housing having a substantially-flat apex at said first portion, said substantially-flat apex transitioning to an outward radius of 0.125 inches.

9. The interface clip according to claim 1, wherein said outer surface and said inner surface are solid.

10. The interface clip according to claim 1, wherein said longitudinal housing is non-perforated.

* * * * *